(12) United States Patent
Busby, IV

(10) Patent No.: US 10,905,055 B2
(45) Date of Patent: Feb. 2, 2021

(54) DISSOLVABLE COLLECTION SYSTEM FOR TURPENTINE PRODUCTION

(71) Applicant: Lloyd Kelsey Busby, IV, Hinesville, GA (US)

(72) Inventor: Lloyd Kelsey Busby, IV, Hinesville, GA (US)

( * ) Notice: Subject to any disclaimer, the term of this patent is extended or adjusted under 35 U.S.C. 154(b) by 635 days.

(21) Appl. No.: 15/681,229

(22) Filed: Aug. 18, 2017

(65) Prior Publication Data
US 2018/0049380 A1 Feb. 22, 2018

Related U.S. Application Data

(60) Provisional application No. 62/530,505, filed on Jul. 10, 2017, provisional application No. 62/376,451, filed on Aug. 18, 2016.

(51) Int. Cl.
*A01G 23/14* (2006.01)
*B05B 17/04* (2006.01)
*G01S 19/14* (2010.01)

(52) U.S. Cl.
CPC .............. *A01G 23/14* (2013.01); *B05B 17/04* (2013.01); *G01S 19/14* (2013.01)

(58) Field of Classification Search
CPC ......... A01G 23/10; A01G 23/12; A01G 23/14
See application file for complete search history.

(56) References Cited

U.S. PATENT DOCUMENTS

| | | | | |
|---|---|---|---|---|
| 2,566,464 A | * | 9/1951 | Redenback | A01G 23/10 144/104 |
| 2,718,341 A | * | 9/1955 | Seewaldt | A01G 23/10 224/257 |
| 2,738,620 A | * | 3/1956 | Roberts, Sr. | A01G 23/10 47/12 |
| 3,178,854 A | * | 4/1965 | Barron, Jr. | A01G 23/14 47/11 |
| 3,295,254 A | * | 1/1967 | Schoonman | A01G 7/06 47/57.5 |
| 3,304,654 A | * | 2/1967 | Reynolds | A01G 23/14 47/50 |
| 4,090,328 A | * | 5/1978 | Enos, Jr. | A01G 7/06 47/12 |
| 4,176,495 A | * | 12/1979 | Dale | A01G 7/06 47/10 |
| 5,425,201 A | * | 6/1995 | Merving | A01G 7/06 47/57.5 |
| 5,564,227 A | | 10/1996 | Chabot | |
| 9,121,306 B2 | | 9/2015 | Aizenberg et al. | |

(Continued)

FOREIGN PATENT DOCUMENTS

CN 103415200 A 11/2013

OTHER PUBLICATIONS

Copenheaver, "International Search Report and Written Opinion of PCT/US2017/047665", dated Oct. 27, 2017, 15 pages.

*Primary Examiner* — Christopher D Hutchens
(74) *Attorney, Agent, or Firm* — Johnson, Marcou, Isaacs & Nix, LLC

(57) ABSTRACT

A dissolvable turpentine receiving system includes a pipe, collection bag, collection spout, and other elements such as seals and ties, required for the harvesting of oleoresin from trees for production of turpentine. Critical to this disclosure is the requirement that all of these components are dissolvable in turpentine.

13 Claims, 11 Drawing Sheets

(56) References Cited

U.S. PATENT DOCUMENTS

| | | |
|---|---|---|
| 9,353,646 B2 | 5/2016 | Aizenberg et al. |
| 9,961,843 B2 * | 5/2018 | Gardner .................. A01G 23/10 |
| 2010/0170152 A1 | 7/2010 | Perkins |
| 2011/0088316 A1 | 4/2011 | Leger et al. |
| 2012/0288646 A1 | 11/2012 | Groeger et al. |
| 2013/0017134 A1 | 1/2013 | Scally et al. |
| 2013/0174478 A1 | 7/2013 | Cote et al. |
| 2015/0034209 A1 * | 2/2015 | Davis ..................... A01G 23/10 |
| | | 144/93.1 |
| 2015/0167868 A1 | 6/2015 | Boncha |
| 2017/0112077 A1 * | 4/2017 | Gardner .................. A01G 23/10 |
| 2017/0332562 A1 * | 11/2017 | Peele ..................... A01G 23/14 |

* cited by examiner

DISSOLVABLE COLLECTION SYSTEM FOR TURPENTINE PRODUCTION

CROSS-REFERENCE TO RELATED APPLICATIONS

This application claims the benefit of U.S. Provisional Application No. 62/376,451 filed Aug. 18, 2016, and U.S. Provisional Application No. 62/530,505 filed Jul. 10, 2017. The entire contents of the above-identified applications are hereby fully incorporated herein by reference.

TECHNICAL FIELD

The invention relates generally to the field of sap collection for turpentine production. More specifically, the invention relates to a dissolvable collection system comprised of a pipe, collection bag, and other elements, such as seals and ties, required for the harvesting of oleoresin from trees.

BACKGROUND

Turpentine is a valuable feed for a wide range of industries including papermaking, pharmaceuticals, electronics, cosmetics, etc. Early collection techniques were principally from scarring the tree and collecting the turpentine in open containers. Recent advances to automate the process and avoid many of the weaknesses of earlier harvesting techniques include drilling into the tree and inserting a plastic pipe that directs the turpentine into a closed bag. These bags are subsequently collected and the resin removed. Unfortunately, this is a labor-intensive process with significant loss of resin and requires the creation and use of waste bags, pipes, and ties.

The present invention relates to a borehole tapping method for producing oleoresin from slash pine. The existing production of turpentine is generally done by using half inch to one inch diameter PVC schedule 49 pipe that must be hand measured and cut into sections approximately three to four inches in length. The ends then must be beveled by hand before using in the tree. An auger is used to drill a hole in the tree. This is accomplished by either a hand held auger or an auger mounted on a box and drilling from a bobcat or tractor. Workers positioned on the ground walk behind and beside the drill to complete the process. During this process, a worker will first spray a chemical solution inside the tree to produce the flow of resin. Next, another worker, using a mallet, taps the spout into the hole, after which a further worker places the bag on the spout and secures it with a zip tie. Finally, another worker sprays the outside of the tree with a pesticide. All steps of spraying and placement of the spout and bag are normally done by hand.

The current methods described above are time consuming and require substantial support in labor. Further, the time period in which trees may be effectively tapped, generally from June through August, is short and therefore, it is imperative that as many trees as possible are tapped during this time period in order to meet the demand for turpentine and to make the tapping process feasible from a financial perspective.

A further disadvantage associated with known tapping and collection methods is the use of the bags in which the sap is collected. As with the other steps of the tapping process described above, collection of the bags is also done by hand, which, again, causes the process to be extremely labor intensive. The collection bag is attached to a PVC schedule 40 pipe, which serves as a spout, with zip ties. Each collection bag and spout must be removed individually from the tree by hand using a mallet to separate the spout and the collection bag from the tree. The collection bag is then separated from the PVC pipe by cutting the zip tie that was holding the bag on the PVC pipe. The collection bag is suspended over a barrel, and the bottom of the bag is cut open to allow the resin to drain into the barrel. When a barrel is filled, a new empty barrel must be rotated into its place. Because collection occurs in the colder months of the year, the draining process is slow and requires at least a full day for completion. Further, the resin solidifies when it is cold and adheres to anything it contacts.

During the collection process, especially during periods with colder temperatures, a considerable amount of resin is lost and cannot be reclaimed from the PVC pipes, or spouts, collection bags, and drums or barrels into which the collection bags drain. Drained, empty collection bags are placed in trash bags and disposed of in landfills with the zip ties, which contributes to environmental concerns.

In light of the disadvantages associated with known methods and devices for tapping trees and collection of resin, there is a need for an improved collection bag and collection process to minimize the amount of resin that is lost during that collection process, to improve the efficiency and costs of the collection process, and to minimize environmental impact of the collection process.

SUMMARY OF THE INVENTION

An object of the present invention, therefore, is to provide a new collection system and method for producing turpentine that eliminates the disadvantages of the known systems described above. Specifically, the present invention contemplates a turpentine receiving system, in which, upon removal from the tapped tree, the turpentine and resin are collected into a dissolvable collection bag disposed within a large container and, in the presence of turpentine, the collection bag and even the other collection components, such as the spout, pipe, and zip ties, are dissolvable, based on the material making up the bag and other components. The freshly harvested turpentine and resin is released into the container. The system and method according to the present invention thereby reduce labor costs, eliminate the plastic collection component waste stream, and enable the farmer to collect 100% of the available harvest.

One object of the present invention, therefore, is to provide an automated, self-contained apparatus for tapping trees and for high-speed, efficient turpentine production. The apparatus is attached to and operated from a delivery vehicle such as a tractor or skid steer. All components of the tapping process are mounted inside or on the apparatus. The apparatus may include components that utilize GPS and current robotic technology to enable autonomous operation of the apparatus.

A further object is to provide a collection bag, spout and other accessories used in the apparatus that is made from components that are soluble and biodegradable, such that the components from which the bag is made will dissolve in the distilling process with the resin.

A further object is to provide a collection bag and other processing materials that are all made of a material that prevents resin from adhering to the collection bag and the other processing materials, thus enabling more of the final product to be obtained.

Another object is to provide an improved spout with a vacuum effect that permits more efficient and faster extraction of the sap from the tree.

A further object of the invention is to provide an improved and high-speed method for extraction of sap from trees and for processing turpentine, using the apparatus and dissolvable collection assembly according to the invention.

These and other aspects, objects, features, and advantages of the example embodiments will become apparent to those having ordinary skill in the art upon consideration of the following detailed description of illustrated example embodiments.

DETAILED DESCRIPTION OF THE EXEMPLARY EMBODIMENTS

Figure 1A:
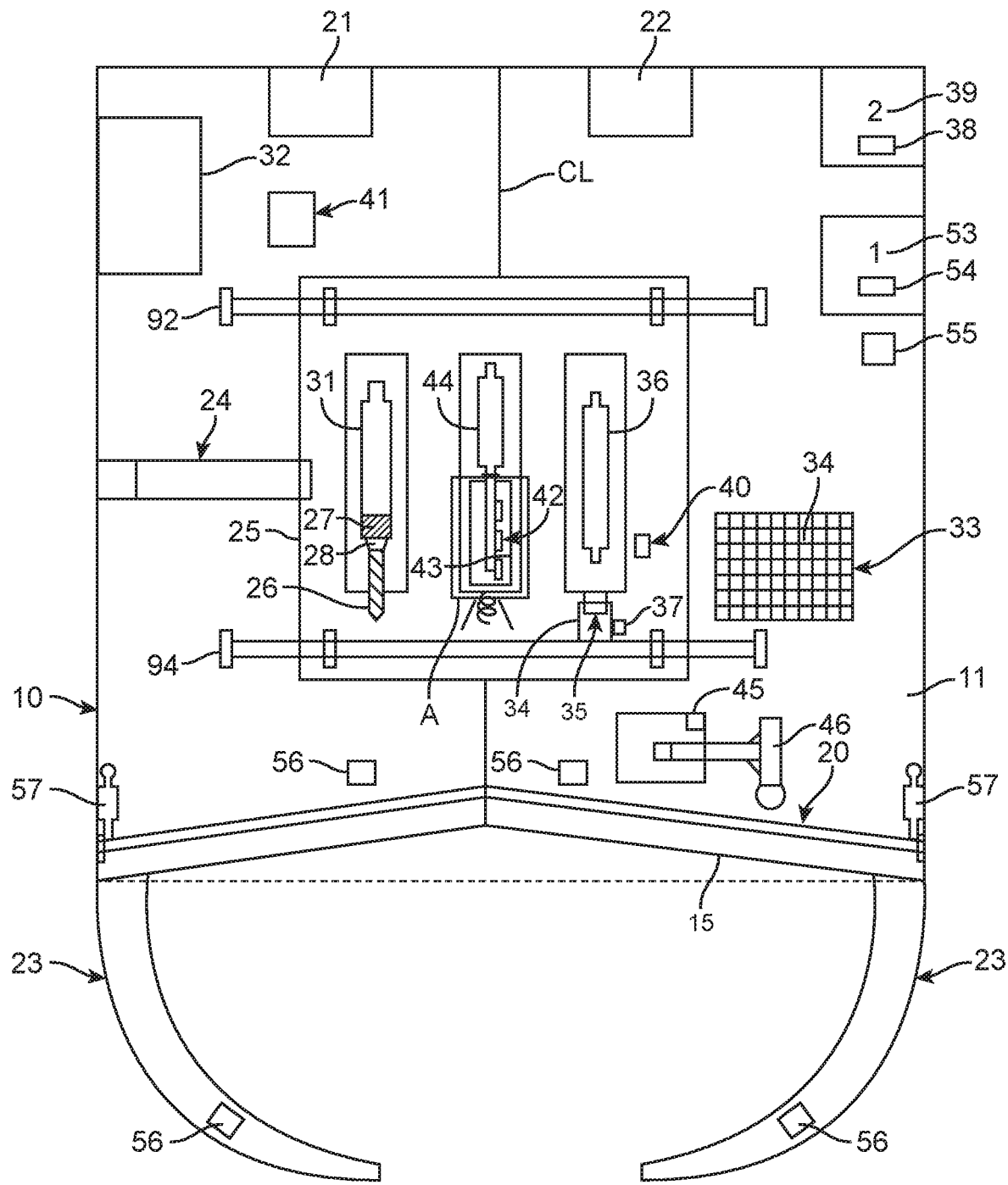
FIG. 1A is a perspective view of the apparatus.

As shown in FIG. 1A, the automated, self-contained apparatus 10 for tapping trees and for high-speed, efficient turpentine production and is attached to and operated from a delivery vehicle, such as a tractor or skid steer (not shown). The apparatus 10 includes a floor 11 and a three-sided square box 12. The front of the box 12 is open. The floor includes a V-shaped section 15. A V-shaped top bar 20 disposed above the V-shaped section 15 mirrors the V-shape of the V-shaped section 15. All components involved in the tapping process, which will be described below, are mounted inside or on the apparatus 10.

The apparatus 10 includes a dissolvable collection system 80, which includes a collection spout 49, a transfer pipe 70, and a collection bag 43.

The V-shaped section in the floor is stationary. The top V-shaped bar automatically adjust forwards or backwards to give the correct angle for the apparatus 10. This is accomplished by controlling two cylinders 57 that are connected to each end of the top V-shaped bar 20 that allows it to move inside a rail (now shown), which is connected to the side wall of the apparatus 10. The hydraulic cylinders 57 are controlled by a gyro, computer, and electric hydraulic valve 22 bank.

The apparatus 10 uses GPS, cameras, gyro, auto-pilot, and geo-fencing along with computers, a programmable logic controller, and modern robotics to make the system autonomous and automated. Initially, the computer on the apparatus 10 determines if the tree is large enough to be tapped and how many taps it can support. The apparatus 10 makes contact with the tree at the middle of the V-shaped section 15 of the floor and the V-shaped bar 20 directly above.

This provides the apparatus 10 with two points of contact with the tree. The apparatus 10, therefore, cannot tilt forward or backward. Two points of contact also ensure that the apparatus 10 is centered with the tree. The Programmable Logic Controller (PLC) 21 will then start a sequence of events. The PLC will open the electric hydraulic valve 22 moving the top V-shaped bar 20. The top V-shaped bar is moved by hydraulic cylinders 57 forwards or backwards to give the correct angle for the apparatus 10. The PLC 21 opens the electric hydraulic valve 22 allowing the arms 23 to go around the tree to hold the apparatus 10 tightly in place during drilling, tapping, and spraying. The PLC 21 opens the electric hydraulic valve 22 moving a hydraulic cylinder 24 in order to move the mounting plate 25 that it is attached to. The mounting plate 25 will move to the left to align the drill bit 26 with the tree.

Figure 3A:
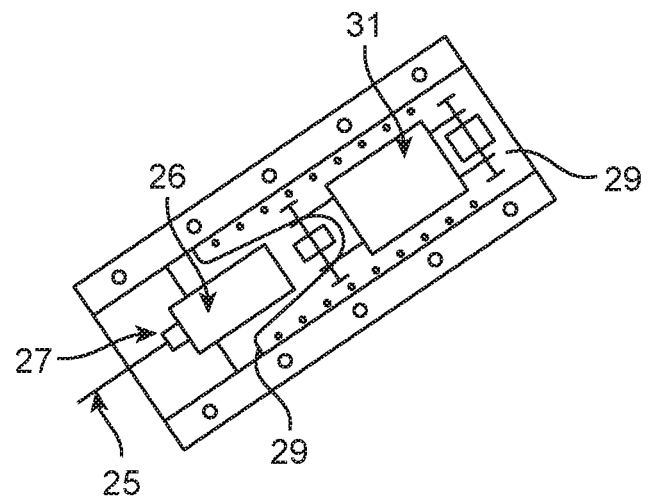
FIGS. 3A and 3B show a top and side view, respectively, of a slide for the drill bit.
Figure 3B:
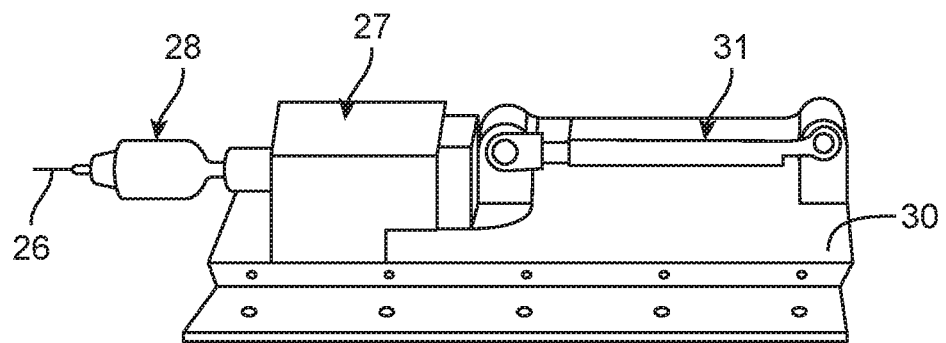

The PLC 21 then opens the electric hydraulic valve 22 that powers a hydraulic motor 27. As shown in FIGS. 3A and 3B, a chuck 28 is mounted on the shaft of the hydraulic motor 27, and a custom-made drill bit 26 is placed in this chuck 28. The mounting bracket for the hydraulic motor 27 is bolted to a rectangular slide 29. The rectangle slide 29 travels inside a larger rectangular tube 30 that is stationary. The back of the hydraulic cylinder 31 is attached to the back of the stationary rectangular tubing 30. The front of the cylinder 31 is attached to the front of the rectangle slide 29, directly behind the hydraulic motor 27. The PLC 21 then opens the electric hydraulic valve 22, which activates the hydraulic cylinder 31 moving the rectangle slide 29 forward so the drill bit 26 can drill a hole in the tree. When the cylinder 31 is activated to move the drill bit 26 forward, the vacuum 32 begins to remove all shavings. The cylinder 31 travels its maximum length; next, it will retract and the drill bit 26 and vacuum 32 will stop when fully retracted by the PLC 21.

The PLC 21 opens the electric hydraulic valve 22 moving a hydraulic cylinder 24 until the cylinder 24 is fully retracted moving the mounting plate 25 to the right.

Figure 4:
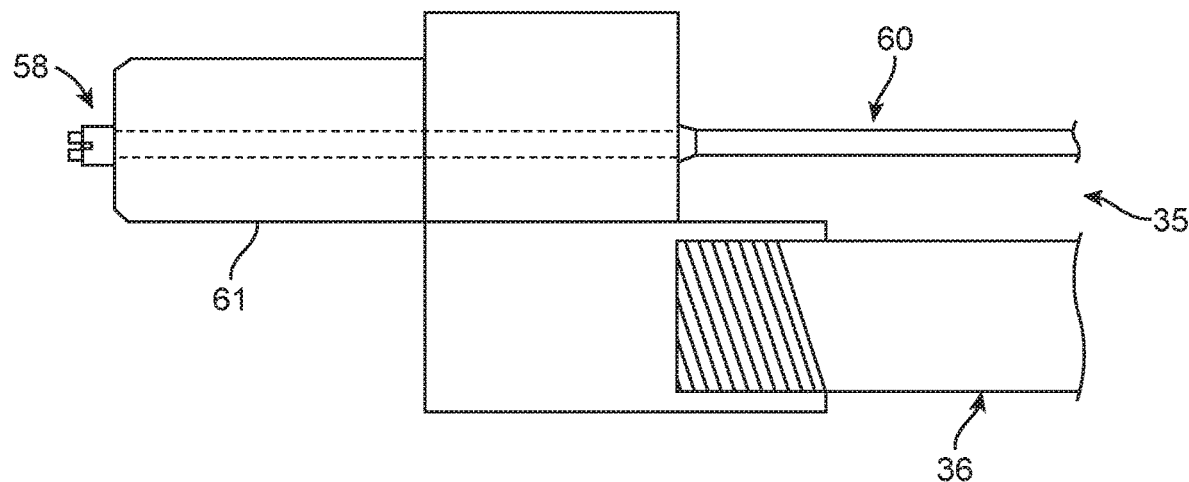
FIG. 4 is a side view of the plunger spray applicator attached to a hydraulic cylinder.

The plunger spray applicator 35 is shown in greater detail FIG. 4. The PLC 21 activates the hopper 33. It will feed a spout 34 into position in front of a plunger spray applicator 35 that is mounted on the front of a hydraulic cylinder 36. The hydraulic cylinder 36 is in line with the drilled hole. The hydraulic cylinder 36 moves the plunger spray applicator 35 forward. As the hydraulic cylinder 36 moves the spout 34 forward to be placed in the hole, it will trip a limit switch 37 at a predetermined distance prior to the spout 34 being placed in the hole in the tree. Just before the spout 34 is placed, the limit switch 37 will activate an electric motor 54 on the spray tank 53 and the solenoid valve 55 spraying a chemical that stimulates the flow of resin in the tree. When the cylinder 36 is fully extended, it partially embeds/presses a portion of the spout 34 into the tree with a tight pressed fit. The cylinder 36 then retracts leaving the spout 34 in place.

Figure 5:
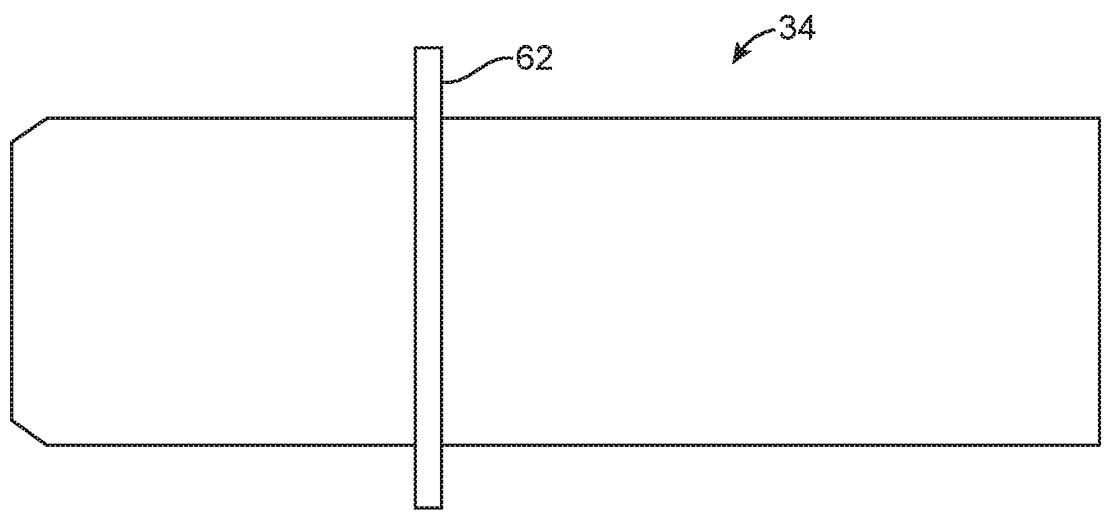
FIG. 5 is a side view of a spout.

The apparatus 10 further includes a bag spout combination formed as one piece. A spout 34 with a shoulder 62 is positioned between ⅓" to ½" inch down the neck of the spout. The shoulder 62 will act as a pushing point to press into the tree that doubles as a stop. The shoulder 62 also acts as guide in the hopper 33. The hopper 33 will feed the spout out of the bottom into a clamp that will push it into the tree, and a bag will follow as it is attached to the spout. This will remove the need to handle the bag, spout, and zip tie individually. FIG. 5 shows a side view of the spout 34 with shoulder 62, which will be described below.

The PLC 21 redirects the vacuum 32 by reconfiguring a vacuum gate 41. This allows suction cups 42 to lift a collection bag 43 and exhaust from the vacuum 32 will inflate the collection bag 59 to open the mouth of the collection bag 59. The PLC 21 opens the hydraulic valve 22 moving the hydraulic cylinder 44 forward, placing the collection bag 59 over the spout 34. At the same time, an actuator 45 puts the automatic cable tying system 46 around the collection bag 59 and spout 34 securing the collection bag 59 with a zip tie around the spout 34 for the resin to drain into. The vacuum system 32 turns off thereby releasing the collection bag 59. The actuator 45 will activate putting the cable tie system 46 back to its original position.

The apparatus 10 is provided with two grapple arms 23 that are configured to hold the tree in place with a constant pressure to ensure that the tree is not damaged. The apparatus cannot move away from the tree during the process. The mounting plate 25 clears the floor of the apparatus 10 and is mounted to two steel rods 92, 94, one in the front and one in the back. A block, provided with a bushing or bearing, is disposed on each corner through which the steel shaft passes. Four steel blocks bolted to the floor of the apparatus 10 to hold the steel rods 92, 94 in place.

The apparatus 10 may utilize a GPS, auto-pilot, geofencing, Gyro, modern robotics, and cameras to send information for the purpose of navigating the terrain, determining the size of the tree to know if it is big enough to receive a tap and how many taps. These devices monitor the supplies on the apparatus 10 and complete the functions of drilling, tapping, and spraying the trees. Optionally, electric hydraulic valve bank 22 operates all hydraulic cylinders. Optionally, a camera on the implement will measure the diameter of the tree and determine the number of taps the tree will accommodate. The computer communicates with the PLC 21 to distinguish where the second or third holes may be drilled and tapped.

Figure 1B:
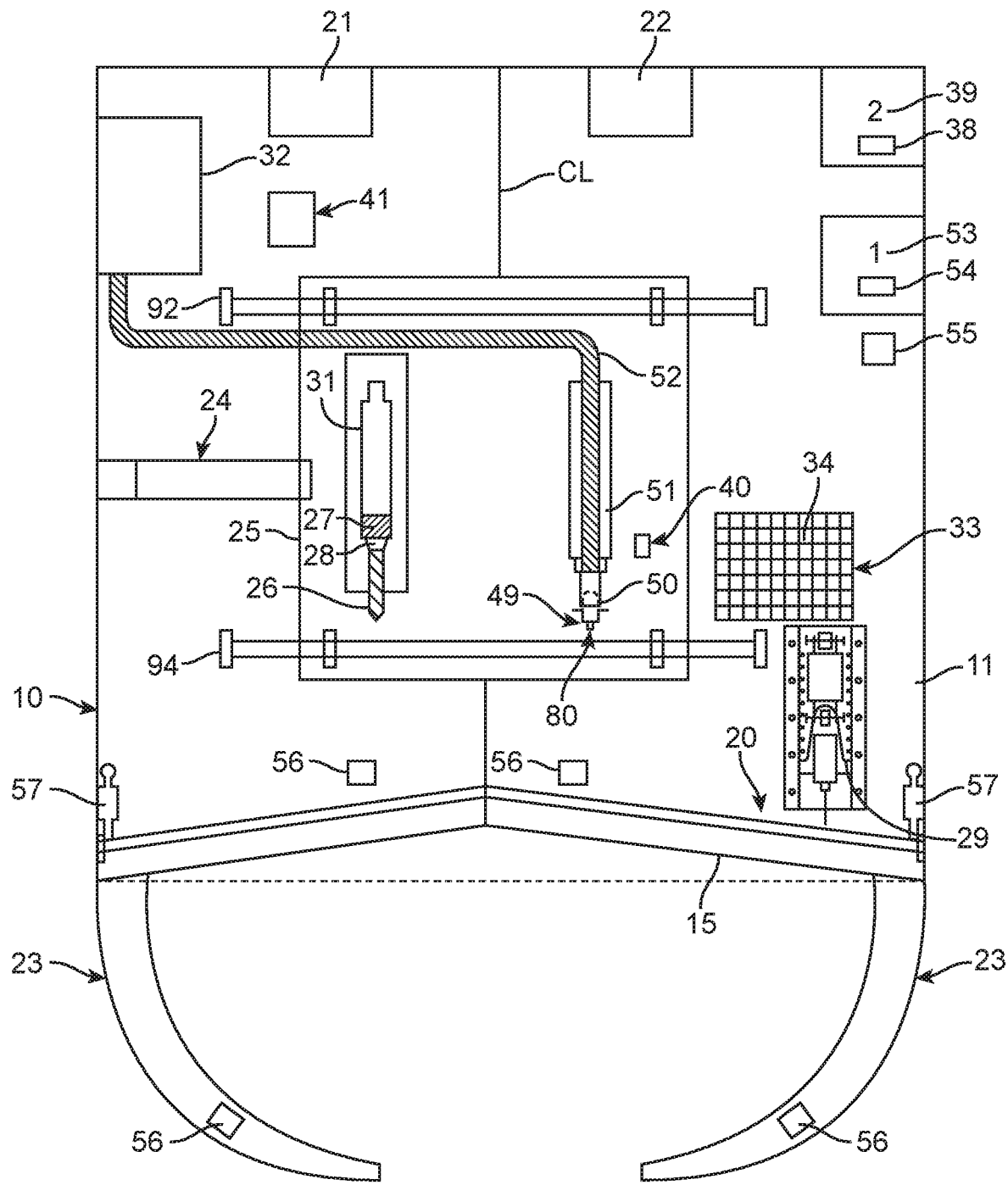
FIG. 1B is a perspective view of a further embodiment of the apparatus.
Figure 2:
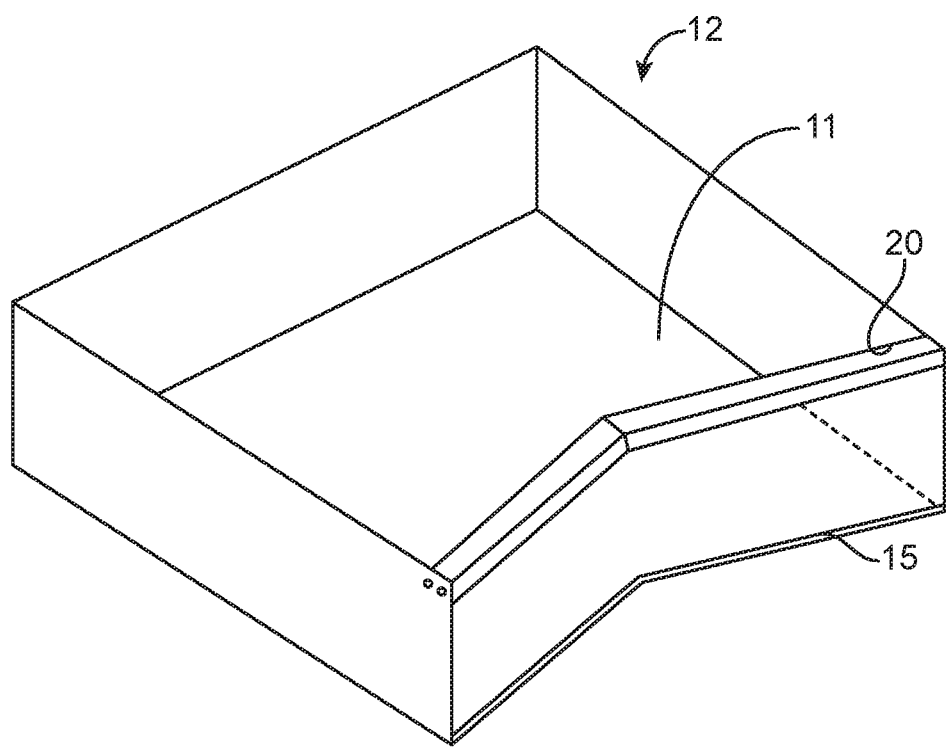
FIG. 2 is a three dimensional view of the frame.
Figure 6A:
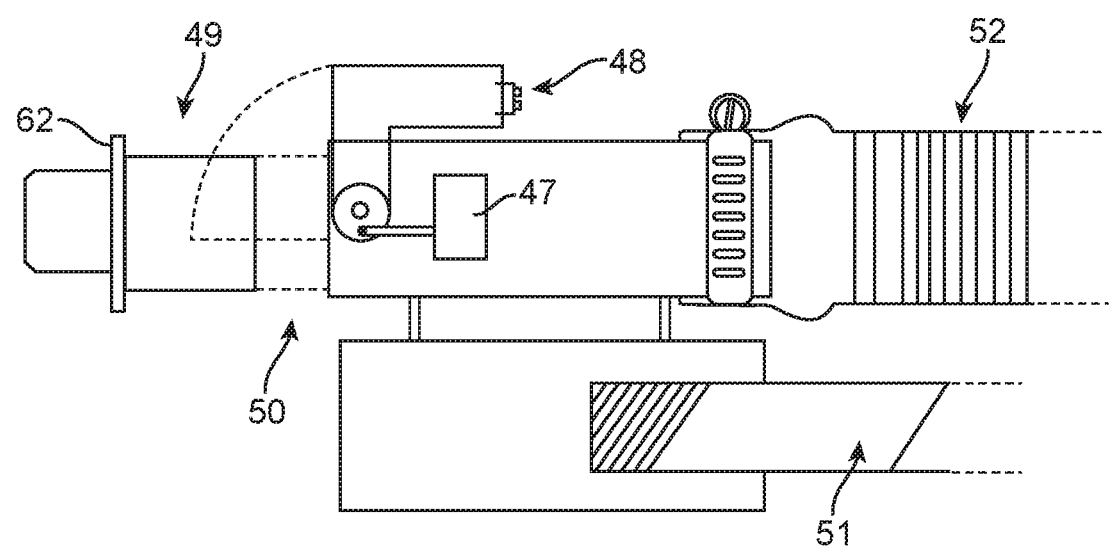
FIG. 6A is a side view of a vacuum plunger attached to a hydraulic cylinder and vacuum spout.

Instead of the spout 34, in an alternative embodiment, the apparatus 10 may include a vacuum spout 49, as shown in FIG. 1B and described in greater detail below with reference to FIGS. 6A, 6B, and 6C. The PLC 21 activates an actuator 47 that moves a spray nozzle 48 in front of the drilled hole in the tree. The PLC 21 further activates an electric motor 54 on the spray tank 53 and the solenoid valve 55 spraying a chemical that stimulates the flow of resin in the tree. The PLC 21 then turns off the electric motor 54 on the spray tank 53 and activates the actuator 47 to move the spray nozzle 48 back to its original position. Next, the PLC 21 activates the hopper 33, which feeds a vacuum spout 49 into position in front of a vacuum plunger 50 mounted on the front of a hydraulic cylinder 51, The vacuum spout 49 is designed with the collection bag 43 folded strategically to fit inside the vacuum spout 49 to make it more compact, as shown in FIG. 7A or the collection bag 43 may be attached to an end of the vacuum spout 49 as shown in FIG. 7B. Once the vacuum spout 49 is in position in front of the vacuum plunger 50, the PLC 21 activates the vacuum 32. The vacuum hose 52 is attached to the back of the vacuum plunger 50. The suction of the vacuum 32 pulls the collection bag 43 out of the vacuum spout 49. The collection bag 43 is sucked into the vacuum hose 52. The open end of the collection bag 43 is welded to the inside of the vacuum spout 49. The PLC 21 activates the hydraulic cylinder 51 that pushes the vacuum spout 49 into the tree. The PLC 21 retracts, thereby leaving the vacuum spout 49 in the tree and returning the cylinder 51 to its starting position. The PLC 21 activates an electric motor 38 on a spray tank 39 and a solenoid valve 40 spraying a chemical through strategically placed nozzles 56 mounted on the implement for insect prevention. The PLC 21 opens the grapple arms 23, releasing the apparatus 10 from the tree. The delivery vehicle now moves to the next tree.

As shown in FIG. 1B, A hydraulic cylinder 24 is attached to the floor of the apparatus 10 and to the mounting plate 25. As shown in FIGS. 3A and 3B, the slide has a low profile to enable the drill bit 26 to be as close to the ground as possible. The slide 65 consists of a rectangle inner slide 29 and an outside frame 30 that bolts to the mounting plate 25. The slide 65 slides on a sheet of plastic wear plate. A plate butts up flush to the bottom of the inside slide 29 and is welded in place. Bolted to the plate is the hydraulic motor mount 68. This allows the drill bit 26 to be directly inline and in front of the hydraulic cylinder 31 and enables the inside slide 29 to be supported on all sides and to move with minimal resistance or unwanted side-to-side movement. The hydraulic cylinder 31 is connected to the back of the outside frame 30 and the front of the hydraulic cylinder 31. The front of the hydraulic cylinder 31 is connected to the top of the inside slide 29. They are in line with the hydraulic motor 27 and drill bit 26. The drill bit 26 may include an added feature that will tap the hole for a threaded spout on the vacuum spout, which will be discussed below.

A custom drill bit 26 preferably has a diameter of 1.27 inches; the transfer pipe 70 averages 1.72 inches in diameter with a 50 thousandths difference in diameter between the drill bit 26 and the PVC pipe 70. This allows for a tight pressed fit but not so tight that it will distort or crimp the pipe that is used as a spout and still maintain an airtight seal. The measurements of this drill bit 26 will correspond with the dimensions of the spouts in the previous embodiments.

The vacuum 32 removes and stores shavings from the drilling process. It is instrumental in handling the spouts and bags individually and combined. The exhaust from the vacuum 32 is utilized to inflate bags and perform other functions. The vacuum 32 operates suction cups 42 for manipulation of the individual bags. The vacuum gate 41 directs the vacuum flow to accomplish tasks in a predetermined order. The hopper 33 is custom designed to work with the design of the spouts, both individual spout and bag or spout bag combination. In place of the hopper 33, a compartmentalized box is provided with a robotic arm programmed to grab the resin collection components and put them in the proper position to be placed in the hole that has been drilled in the tree. Plunger spray applicator 35 is designed so that it will fit inside a spout 34 that does not have a pre-attached bag. It is attached to a hydraulic cylinder 36 and is mounted off to one side of the hydraulic cylinder 36. A chemical hose 60 is attached to the back of the plunger 61 to the spray applicator 35. A spray nozzle 58 is disposed in front of the plunger 61. The liquid spray passes through the center of the plunger 61.

As discussed above, an alternative to the plunger spray applicator 35 is the vacuum plunger 50. As shown in FIGS. 6A 6B, and 6C, includes a vacuum spout 49 that includes a collection bag 43 that is folded and placed inside the vacuum spout 49, to make it more compact (FIG. 7). The vacuum 32 suctions the collection bag 43 out of the vacuum spout 49 and into the vacuum hose 52 into position as it is traveling to the tree to be placed in the drilled hole in the tree. The vacuum spout 49 is provided with wide, large threads 75, so that only a minimal number of turns are required to pull the vacuum spout 49 into the tree. This will increase holding capacity and to avoid cross threading. It is also slightly wedged to make a tight fit to avoid resin from leaking. The vacuum spout 49 may include a shoulder 62 to control depth and a bolt head element 72, positioned behind the shoulder 62, to allow it to be screwed in or out of the tree. A groove 74 may be provided behind the bolt head element 72 for a cable tie to allow a replacement collection bag 43 to be zip-tied to replace the first filled collection bag 43 after its removal that was originally welded to the inside of the vacuum spout 49.

The vacuum plunger 50 is designed so that it will fit over the large end of the vacuum spout 49. The large end of the vacuum spout 49 contains the folded collection bag 43. The vacuum plunger 50 is attached to a hydraulic cylinder 51 and is mounted off to one side of the hydraulic cylinder 51. The back end of the plunger is attached to a vacuum hose 52. The front of the vacuum spout 49 has a smaller diameter, and the outside of the vacuum spout 49 has a shoulder 62 that separates the exterior front from the back of the vacuum spout 49. This works as a stop and to form a vacuum seal so that the vacuum 32 will pull the collection bag 43 out of the vacuum spout 49 and into the vacuum hose 52 as the cylinder 51 is moving forward to place the smaller diameter of the vacuum spout 49 into the hole of the tree. When the vacuum plunger 50 retracts it will leave the vacuum spout 49 and the collection bag 43 will come out of the vacuum plunger 50 and vacuum hose 52. The vacuum plunger 50 may be configured to have shape that confirms to that of the vacuum spout 49 so it will be able to be turned like a wrench. The vacuum spout 49 may be turned by a motor, for example a hydraulic or an electric motor that will be controlled by the PLC 21. Between the cylinder 51 and the vacuum plunger 50, a spring may be provided that will allow the vacuum spout 49 to turn while it is in contact with the tree while the cylinder 51 moves forward to allow the spout adequate time to make a full rotation or until the threads on the spout take hold of the threaded hole in the tree, thereby preventing the vacuum spout 49 from being damaged.

Figure 6B:
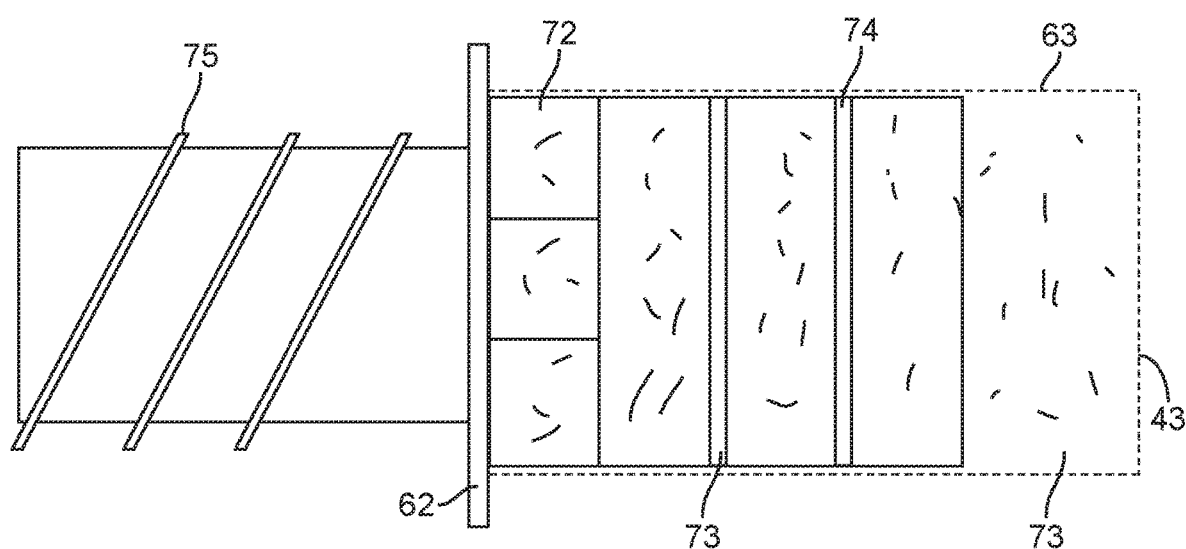
FIG. 6B is a further are side view of the vacuum spout and collection bag.
Figure 6C:
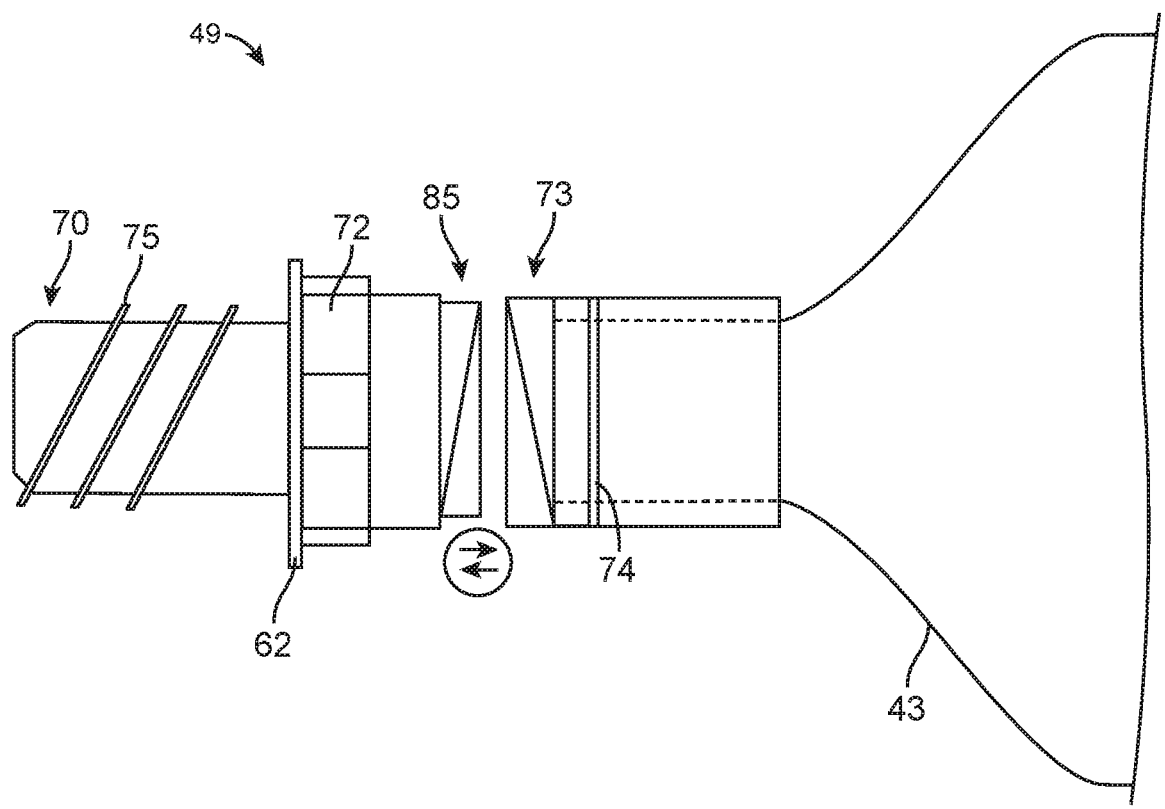
FIG. 6C is a further side view of the vacuum spout and collection bag.
Figure 7A:
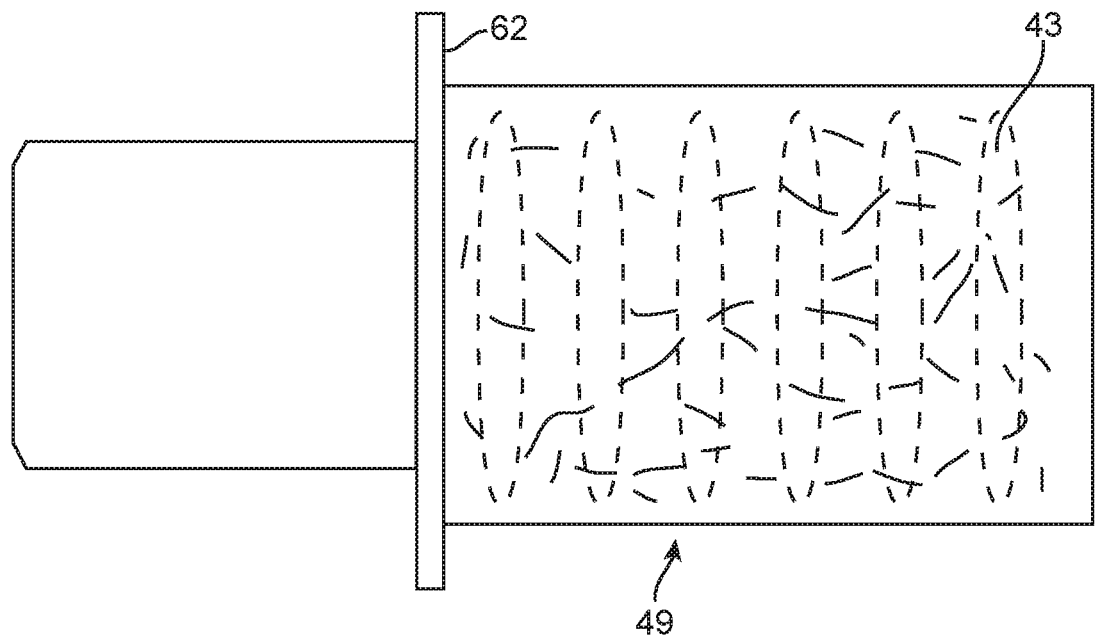
FIG. 7A shows a side view of a vacuum spout with a collection bag folded and contained therein.
Figure 7B:
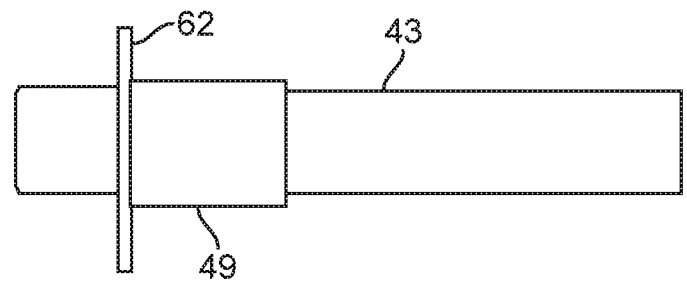
FIG. 7B shows a side view of a vacuum spout with a collection bag attached.
Figure 8:
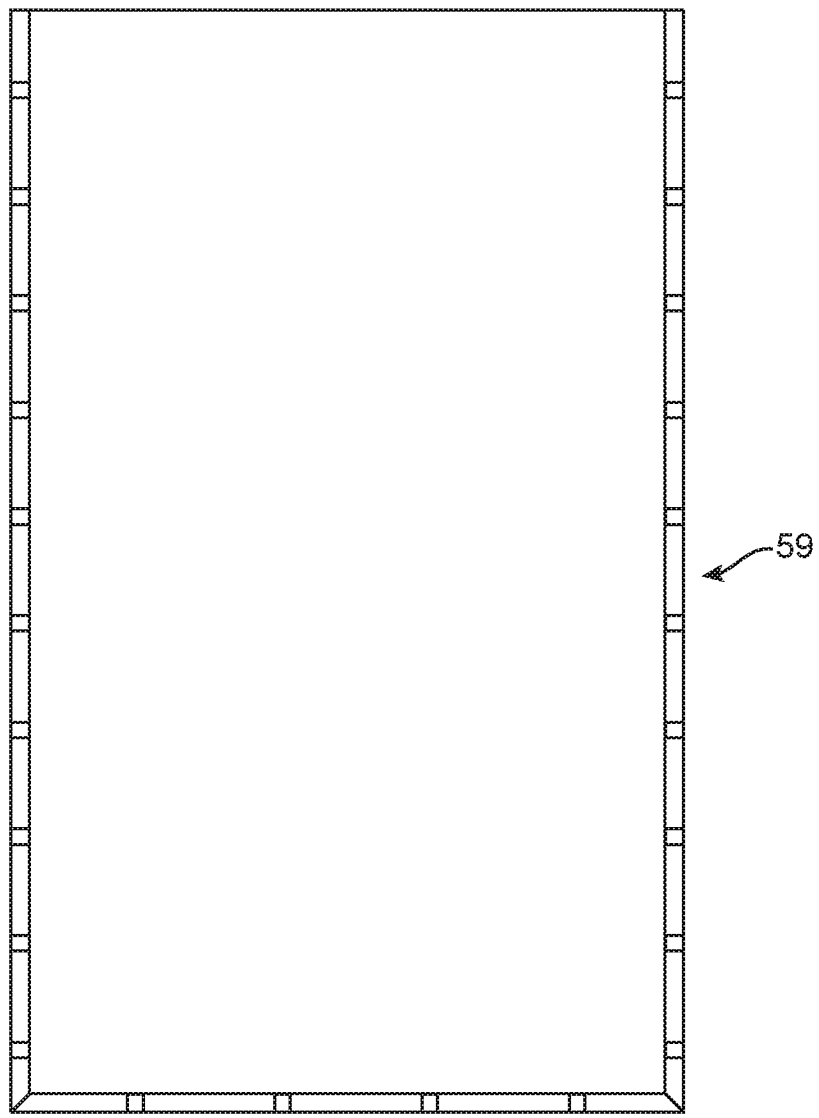
FIG. 8 shows a collection bag according to the present invention.

As shown in FIGS. 6B and 6C, the vacuum spout 49 may be formed in two parts 85, 73, so the two parts 85, 73 may be separated from one another proximate the position where the bag is welded in the vacuum spout 49. Part 73 may be replaced with a replacement part 73 with a bag 43 that is welded to a half of the large end of the vacuum spout 49 that can be screwed back in place without the use of zip ties or removing the threaded spout 49 from the tree. As shown in FIG. 6B, bolt head element 72 forms the larger end of the spout 49. Bolt head element 72 allows the vacuum spout plunger 61 to slide over it like a socket and turn the spout 49, thus advancing the spout 49 in a screw-like manner into the tree. When the collection bag 43 is full of resin, spout part 73 can be removed by twisting. As noted above, the collection bag 43 is welded to the interior of spout part 73. After spout part 73 has been removed, the collection bag 43 may be paced in the turpentine drum, and a replacement spout part 73 with a new collection bag 43 welded thereto will be attached to spout part 85. In this manner, resin can continue to be harvested without removing the spout 49 completely from the tree. Spout part 73 may be utilized with the vacuum spout 49 either when the collection bag 43 is positioned inside the large end of the spout and in the containment tube, or when the collection bag 43 is attached to the spout 49 and trails behind it, as shown in FIG. 6C.

In the alternative to removing spout part 73, the collection bag 43 may be cut flush with the large end of the spout, the bolt head element 72 and a collection bag 43 is placed over the bolt head element 72 of the spout. A groove 74 is provided, about which a zip tie may be fitted to press the bag 43 into the groove 43. The profile of the groove 74 is sized to accommodate the zip tie and provides an effective seal for the bag, preventing debris from entering the bag. The bag 43 also more effectively grips the spout 49.

It is contemplated that the plastic bag, spout or both can be made from a hardened, bio-based polymer from pine rosin. The benefits of using a pine sap derivative in the manufacturing of plastic parts for pine sap collection is two fold: (1) plastic bags and other parts may be processed along with the pine sap collected without interfering significantly with the properties of the products collected, and (2) the replacement of standard petroleum-based plastics with a material originated from biorenewable resources represents a natural positive environmental impact. Rosin isolated from pine sap was free radically co-polymerized with styrene at various ratios, leading to a range of co-polymers of different properties. The use of styrene as a reactive diluent was justified by its low adhesion to pine sap. Different ratios of pine rosin:styrene were prepared, and in each case benzyl peroxide (5.0 wt % of the total mixture weight) was employed as the free radical initiator. The pine rosin was melted in a water bath at 100° C. prior to the addition of styrene and benzyl peroxide to allow for thorough mixing of all components. After mixing, the reaction mixture was placed in a capped vial and heated at 110° C. in convection oven for eight hours to ensure complete cure of the resin. In preliminary trials, a resin containing 90 wt % of pine rosin and 10 wt % styrene showed promising results.

During development of the present invention, a polyethylene bag was filled with resin and sealed to simulate a typical bag collected from the field. The sealed bag with its contents was then immersed in a larger container filled with pine resin that had been preheated 120° C. The simulated collection bag quickly softened and within two minutes, had degraded and released its contents into the larger container. Within approximately 10 minutes, the simulated collection bag had completely disappeared.

The exterior of the collection bag may be coated or co-extruded with a thin opaque layer (commonly black) so as to reduce UV damage that can deteriorate or damage the bag, resulting in failure and loss of product.

The interior of the collection bag may be coated with a functional barrier coating capable of (1) reducing the diffusion of low-molecular weight products within the resin and the ultimate loss of this high value fraction; and (2) reducing the diffusion of solvents into the collection bag that can degrade the collection bag to the point of failure. Ethylene vinyl alcohol is contemplated as one example of a substance that can be used as a barrier coating.

The drum, drum liner, collection bag, and spout are also designed to have non-adherent surfaces, that is, to be "slick", so the resin does not stick to it. Examples are non-stick Teflon or the anti-adhesive properties of the pitcher plant. For example, the drum, bag, liner, and/or spout, and the interior layer (i.e. that side of the bag in contact with the resin) can be treated with a non-stick surface coating. This might include traditional non-stick coatings (e.g. fluorinated coating such as Teflon® or other coatings such as those described in the patents by Joanna Aizenberg, et.al. (U.S. Pat. Nos. 9,121,306, 9,121,306, 9,353,646).

It is further contemplated that all components for use with the drum, drum liner, collection bag, spout, and zip tie may be put through processing equipment where all of the above mentioned components can be shredded, pressed, and washed with turpentine to remove the resin from the remains of the components, then separated from the turpentine and resin by a filter. All resulting materials are biodegradable.

A liner may be provided that will fit inside the transport barrels. The liner has the same properties as the bag, spout, and zip tie. One liner is dissolvable in the turpentine distilling process. Another liner will have properties that do not allow the resin to stick to it and will be biodegradable. This saves time in the draining process and helps with the handling of the turpentine and allows the liner to be reused several times.

The present invention further contemplates an individual spout that is used for a worker who prefers to hand drill their trees, then attach the collection bag by hand. This method is used for the original Borehole Tapping Method of Oleoresin of Slash Pine. In this embodiment, the spout comes in different widths and with a threaded end so that a plastic bottle can be attached to the spout. This accommodates the collection of syrup from Sycamore and River Birch in the southern US.

The present invention further contemplates that the collection drum is made from resin. The resin drum is included in the turpentine distilling process with the raw resin. This will increase the grade of turpentine from the domestic paper and pulp industry and foreign sources.

The collection bag and spout, by way of example, can be a dissolvable bag and spout made of material that have similar properties of oleoresin and will dissolve into the oleoresin at the still without compromising the purity of the oleoresin. This eliminates the step of suspending the collection bag to drain the oleoresin, thus saving time and labor during the collection process. Materials contemplated for use for the collection bag and spout include polyethylene and other similar types of materials that are dissolvable in oleoresin.

In a further embodiment, the collection spout 34 or vacuum spout 49 may be made out of a compound, such that when the spout 34, 49 is inserted into the drilled hole at the base of the drill, a defensive reaction from the tree would be produced, causing the tree to increase oleoresin flow by incorporating slow release chemicals. As the compound for forming the spout, 34, 49, it is contemplated that chitin/chitosan is utilized. The spout 34, 49 may be formed primarily out of chitin. Alternatively or additionally, chitin may be used as a filler in polymers for the spout 34, 49, drum liner, packaging material, collection bag 43, and zip ties. The use of chitin/chitosan also would protect against insects and pathogens.

In a further embodiment, the spout may be formed of a compound that is capable of dissolving or breaking down in layers over time, so that the spout 34, 49 systematically releases chemicals over a period of time into the tree's drilled hole to increase oleoresin flow. By way of example, the time release of the chemicals would be similar to that of a time-released medication, such as Tylenol®. Chitosan has been demonstrated to be an effective biocide, able to accelerate resin flow, and can be used to produce large scale plastic. On one level, chitosan may be used as the structural polymer and might, by the proper selection of molecular weight distribution, provide structure as well as chemical accelerant for resin flow and a biocide. In this case, the transport of the chitosan might occur through one or more of several pathways; (1) diffusion of lower molecular weight chitin to the surface of the structure and transport to the tree; (2) dissolution of the surface layers of chitosan and transport to the tree; and (3) a matrix with a second polymer (e.g. a hydrogel) that would hold and release a more mobile form chitosan. An example of a hydrogel is polyvinyl alcohol (PVA) that can be crosslinked, homogeneously or in a gradient, to control the chitosan release.

In yet a further embodiment, the spout 34, 49 may be formed of a porous material so that a chemical may be released from the spout 34, 49. An example of this is a porous oil impregnated bushing. As the porous material, it is contemplated that a sintered metal or a polymer may be utilized. Sintered metals take advantage of pores between the powder particles to create a strong capillary force that draws the oil into the matrix. Small holes, for example between 10 microns and 1,000 microns, may be drilled or burned by lasers or other suitable mechanisms across the surface of the structure. These holes would create channels with strong capillary potential and could simulate a sintered matrix. Alternatively, a structure with a bio-component polymer matrix could be produced, and then, one of those components is removed so as to leave behind a void filled layer. One example of this might be a polyethylene-terephthalate/polylactic acid matrix whereby the PLA is remove with a mild caustic wash. This layer would provide the capillary force and a place for the active chemical to be stored. Finally, mechanically rough-up the surface may be mechanically roughened, so as to create a high-void surface region that could draw-in and hold the active chemicals.

It is also contemplated that chitin/chitosan may be applied in a liquid form by spraying into the drilled hole in the tree base to increase oleoresin flow.

It is further contemplated that chitin/chitosan may be applied in a liquid form to the face of a tree by spraying in order to detour beetles or other insects from attacking the tree while it is in a stressed state.

It is contemplated additionally that chitin/chitosan may be placed in the surrounding soil in a solid or liquid form at the base of the tree, so that the chitin/chitosan is taken up and absorbed through the tree root system. Application of chitin/chitosan to the tree via the root system will enhance oleoresin flow, deter beetle attacks, and protect against pathogens.

Chitin/chitosan may be used to strategically spray saplings in order to protect them against insects and pathogens.

The high-speed apparatus described above addresses and resolves a number of problems associated with the tapping of trees, including the reduction of labor, lowing the costs of labor per tree for tapping, and increasing productivity which, in turn, increases profit. Further, the resin produced by the system according to the application provides the added benefit of a very clean resin, which eliminates the need for any additional cleaning processes. It also helps reduce the chances of insects in the pine trees. The system according to the present application offers the potential of supplementing existing businesses such as landscapers, pine straw collectors, and anyone who works outside with heavy equipment. This will offer business opportunities to land owners or anyone who works in forestry, hobby or commercial farming, or homesteading. This will also increase the production and profit of the existing resin industries.

All publications, patents, and patent applications mentioned herein are incorporated by reference to the same extent as if each individual publication, patent or patent application was specifically and individually indicated to be incorporated by reference in its entirety. In the event of there being a difference between definitions set forth in this application and those in documents incorporated herein by reference, the definitions set forth herein control.

What is claimed is:

1. A dissolvable collection system for collection of pine resin from trees, comprising:
   a spout with at least one end configured for insertion into a bore formed in a trunk of a tree;
   a transfer pipe configured for attachment to said spout and for transporting of the pine resin from the spout;

a collection bag configured for attachment to said transfer pipe and/or said spout for collection of pine resin transferred through said transfer pipe from said spout, wherein each of the spout, transfer pipe and/or collection bag are made of a material comprising a percentage of pine rosin, the material being biodegradable and soluble in turpentine.

2. The dissolvable collection system of claim 1, wherein the material comprising the spout, transfer pipe and/or collection bag is polyethylene.

3. The dissolvable collection system of claim 1, wherein the collection bag has an interior surface and an exterior surface, wherein each of the interior and exterior surfaces includes a coating comprised of a material to which oleoresin does not adhere.

4. An automated apparatus for tapping trees for collection of pine resin, comprising:
 a programmable controller configured to control operation of components of said apparatus;
 a hydraulic control assembly that is actuatable by said programmable controller for effecting movement of components of said apparatus;
 a frame comprising a floor, frame box, and an upper contact bar;
 at least two arms for engaging and holding a selected tree during tapping;
 a drilling element mounted to said frame for forming a drill hole in a selected tree for extraction of oleoresin;
 a spray nozzle positionable in front of the drill hole in the selected tree, said spray nozzle containing a solution for inducing a flow of pine resin from said tree and configured to spray said solution into said bore hole; and
 a dissolvable collection assembly for collecting the pine resin from the selected tree, said assembly including a spout having at least one end configured for insertion into said drill hole; a transfer pipe for connection to said spout for receiving the flow of the pine resin; and a collection bag attached to an end of said transfer pipe for collection of said flow of the pine resin into the collection bag, wherein each of the spout, the transfer pipe, and/or the collection bag are made of a material comprising a percentage of pine rosin, the material being biodegradable and soluble in turpentine.

5. The automated apparatus of claim 4, wherein said floor and said upper contact bar each include a V-shaped section, said V-shaped section of said upper contact bar disposed above said V-shaped section of said floor, wherein the V-shaped section of said upper contact bar and said V-shaped section of said floor form contact points for engaging a tree to be tapped.

6. The automated apparatus of claim 5, wherein said V-shaped section of said floor is stationary and said V-shaped section of said upper contact bar is moveable by said programmable controller and said hydraulic control assembly relative to said tree to be tapped.

7. The automated apparatus of claim 4, further comprising a global positioning system (GPS) for determining location of a tree to be tapped.

8. The automated apparatus of claim 4, wherein the spout comprises a vacuum spout with a vacuum mechanism configured to facilitate extraction of wood shavings from the drill hole and release of the collection bag.

9. The automated apparatus of claim 8, wherein the collection bag is contained within the vacuum spout and released from said vacuum spout during extraction of the oleoresin.

10. The automated apparatus of claim 4, wherein surfaces of components of said dissolvable collection assembly include a coating that prevents the pine resin from adhering to said surfaces.

11. The automated apparatus of claim 4, wherein components of said dissolvable collection assembly are made from a material that prevents the pine resin from adhering to said components.

12. The automated apparatus of claim 4, wherein the spout is formed as one piece.

13. The automated apparatus of claim 4, wherein the spout is formed with at least two pieces.

* * * * *